US007896791B2

(12) United States Patent
Yamazaki et al.

(10) Patent No.: US 7,896,791 B2
(45) Date of Patent: Mar. 1, 2011

(54) CONDUCTIVE ROLLER AND INSPECTION METHOD THEREFOR

(75) Inventors: Masashi Yamazaki, Yokohama (JP); Shinobu Hasegawa, Yokohama (JP)

(73) Assignee: Synztec Co., Ltd., Tokyo (JP)

( * ) Notice: Subject to any disclaimer, the term of this patent is extended or adjusted under 35 U.S.C. 154(b) by 1086 days.

(21) Appl. No.: 11/632,046

(22) PCT Filed: Mar. 20, 2006

(86) PCT No.: PCT/JP2006/005604

§ 371 (c)(1),
(2), (4) Date: Jan. 10, 2007

(87) PCT Pub. No.: WO2006/098477

PCT Pub. Date: Sep. 21, 2006

(65) Prior Publication Data

US 2007/0230975 A1 Oct. 4, 2007

(30) Foreign Application Priority Data

Mar. 18, 2005 (JP) ................................ 2005-080687

(51) Int. Cl.
*B25F 5/02* (2006.01)
*F16C 13/00* (2006.01)

(52) U.S. Cl. ........................................ 492/56; 29/895.32

(58) Field of Classification Search ................ 492/9, 56, 492/53, 11; 399/176; 29/895.32, 895.3, 29/895

See application file for complete search history.

(56) References Cited

U.S. PATENT DOCUMENTS 5,440,374 A * 8/1995 Kisu .............................. 399/176
5,461,470 A * 10/1995 De Cock et al. .............. 399/228
5,543,900 A * 8/1996 Maebashi et al. ............. 399/176
5,678,136 A 10/1997 Watanabe et al.
5,992,020 A * 11/1999 Minegishi et al. .......... 29/895.33
6,254,976 B1 * 7/2001 Ono ............................ 428/304.4
6,449,035 B1 * 9/2002 Batchelder ................. 356/237.1
6,505,555 B2 * 1/2003 Kanda ............................ 101/217
6,564,023 B2 * 5/2003 Takami et al. .................. 399/50

(Continued)

FOREIGN PATENT DOCUMENTS

JP 58-160857 9/1983

(Continued)

*Primary Examiner* — David P Bryant
*Assistant Examiner* — Jacob J Cigna
(74) *Attorney, Agent, or Firm* — Sughrue Mion, PLLC

(57) ABSTRACT

To provide a conductive roller which does not cause defective images with, for example, black lines, which would otherwise be caused by current leakage due to aggregation of carbon black particles or a similar phenomenon, and a method for inspecting the roller.
The conductive roller having a metallic core and at least one rubber elastic layer provided on the outer peripheral surface of the core, the rubber elastic layer being formed from a conductive rubber which has ion conductivity and which contains carbon black micropowder, characterized in that said rubber elastic layer satisfies the relationship represented by the following formula:

$$|\theta_{max}/\theta_{min}| \leqq 5, \quad [F1]$$

wherein $\theta_{max}$ represents the maximum value of phase difference θ as measured upon application of an AC voltage of 1.0 V within a frequency range of 100 mHz to 10 kHz, and $\theta_{min}$ represents the minimum value of phase difference θ as measured under the same conditions.

12 Claims, 3 Drawing Sheets

U.S. PATENT DOCUMENTS

| | | | | |
|---|---|---|---|---|
| 6,990,305 | B2 * | 1/2006 | Kosuge et al. | 399/176 |
| 2001/0026709 | A1 | 10/2001 | Hara et al. | |
| 2001/0055496 | A1 * | 12/2001 | Shimura et al. | 399/50 |
| 2002/0022142 | A1 | 2/2002 | Harada | |
| 2004/0057749 | A1 * | 3/2004 | Saito et al. | 399/109 |
| 2006/0142131 | A1 * | 6/2006 | Iwamura et al. | 492/9 |
| 2006/0269327 | A1 * | 11/2006 | Mizumoto | 399/176 |

FOREIGN PATENT DOCUMENTS

| | | | |
|---|---|---|---|
| JP | 2003-202750 | A | 7/2003 |
| JP | 2004-191961 | | 7/2004 |
| JP | 2004-263059 | A | 9/2004 |
| JP | 2005-36874 | A | 2/2005 |
| JP | 2005-49852 | | 2/2005 |
| JP | 2006-99036 | A | 4/2006 |

* cited by examiner

CONDUCTIVE ROLLER AND INSPECTION METHOD THEREFOR

TECHNICAL FIELD

The present invention relates to a conductive roller for use in an image-forming apparatus such as an electrophotographic copying machine or a printer, and to a method for inspecting the roller. More particularly, the invention relates to a conductive roller suitable for a charge-imparting roller and to an inspection method therefor.

BACKGROUND ART

Conventionally, a charge-imparting roller for use in an image-forming apparatus is formed of, for example, an epichlorohydrin rubber material to which an ion-conducting agent such as lithium perchlorate has been added.

Such a charge-imparting roller containing an ion-conducting agent has a drawback in that electric resistance of the roller varies considerably in accordance with variation in use conditions, potentially resulting in defective images.

Meanwhile, investigations have been carried out on a roller to which electrical conductivity has been imparted by use of carbon black, and a hybrid-type charge-imparting roller containing an ion-conducting agent and carbon black. Such a charge-imparting roller exhibits comparatively small environmental dependency, but has a drawback in that when carbon black particles are aggregated (dispersion failure), current leakage occurs along a pathway from an aggregation site to a photoreceptor, resulting in defective images with, for example, black lines.

Under the foregoing circumstances, a charge-imparting roller which can be used with consistent performance has been proposed. Specifically, electrical conductivity is imparted to the charge-imparting roller by use of carbon black, in which variation in electrical resistance is minimized to obtain a predetermined resistance value (see Patent Document 1).

However, the present inventors have found that image quality of actually obtained printed products cannot be predicted on the sole basis of variation in electrical resistance. In other words, even when variation conditions in electrical resistance are constant, quality of obtained images may vary.

Patent Document 1:
Japanese Patent Laid-Open (kokai) No. 2003-202750 (in claims and other sections)

DISCLOSURE OF THE INVENTION

Problems to be Solved by the Invention

Under the aforementioned circumstances, an object of the present invention is to provide a conductive roller which does not cause defective images with, for example, black lines, which would otherwise be caused by current leakage due to aggregation of carbon black particles or a similar phenomenon. Another object of the present invention is to provide a method for inspecting the roller.

Means for Solving the Problems

In a first mode of the present invention for solving the aforementioned problems, there is provided a conductive roller comprising a metallic core and at least one rubber elastic layer provided on the outer peripheral surface of the core, the rubber elastic layer being formed from a conductive rubber which has ion conductivity and which contains carbon black micropowder, characterized in that said rubber elastic layer satisfies the relationship represented by the following formula:

$$|\theta_{max}/\theta_{min}| \leqq 5, \quad \text{[F1]}$$

wherein $\theta_{max}$ represents the maximum value of phase difference $\theta$ as measured upon application of an AC voltage of 1.0 V within a frequency range of 100 mHz to 10 kHz, and $\theta_{min}$ represents the minimum value of phase difference $\theta$ as measured under the same conditions.

A second mode of the present invention is directed to a specific embodiment of the conductive roller of the first mode, wherein the minimum value $\theta_{min}$ satisfies the following formula:

$$\theta_{min} \geqq 30 \text{(degrees)}. \quad \text{[F2]}$$

A third mode of the present invention is directed to a specific embodiment of the conductive roller of the first or second mode, wherein the rubber elastic layer is formed of an epichlorohydrin rubber.

A fourth mode of the present invention is directed to a specific embodiment of the conductive roller of any of the first to third modes, wherein the rubber elastic layer contains an ion-conducting agent.

A fifth mode of the present invention is directed to a specific embodiment of the conductive roller of any of the first to fourth modes, wherein the rubber elastic layer has, on a surface thereof, a surface-treated layer which has been formed through treating the surface with a surface-treatment liquid containing an isocyanate; the rubber elastic layer having the surface-treated layer satisfies the relationship represented by the formula F1, wherein $\theta_{max}$ represents the maximum value of phase difference $\theta$ as measured upon application of an AC voltage of 1.0 V within a frequency range of 100 mHz to 10 kHz, and $\theta_{min}$ represents the minimum value of phase difference $\theta$ as measured under the same conditions; and, after removal of the surface-treated layer, the rubber elastic layer also satisfies the relationship represented by the formula F1, wherein $\theta_{max}$ represents the maximum value of phase difference $\theta$ as measured upon application of an AC voltage of 1.0 V within a frequency range of 100 mHz to 10 kHz, and $\theta_{min}$ represents the minimum value of phase difference $\theta$ as measured under the same conditions.

A sixth mode of the present invention is directed to a specific embodiment of the conductive roller of the fifth mode, wherein the surface-treatment liquid further contains carbon black, and/or at least one polymer species selected from among an acrylic fluoropolymer and an acrylic silicone polymer.

In a seventh mode of the present invention, there is provided a method for inspecting a conductive roller having a metallic core and at least one rubber elastic layer provided on the outer peripheral surface of the core, the rubber elastic layer being formed from a conductive rubber having ion conductivity and containing carbon black micropowder, wherein the method comprises determining whether or not the rubber elastic layer satisfies the relationship represented by the following formula:

$$|\theta_{max}/\theta_{min}| \leqq 5, \quad \text{[F3]}$$

wherein $\theta_{max}$ represents the maximum value of phase difference $\theta$ as measured upon application of an AC voltage of 1.0 V within a frequency range of 100 mHz to 10 kHz, and $\theta_{min}$ represents the minimum value of phase difference $\theta$ as measured under the same conditions.

An eighth mode of the present invention is directed to a specific embodiment of the inspection method of the seventh mode, wherein the method comprises determining whether or not the minimum value $\theta_{min}$ of phase difference $\theta$ as measured upon application of an AC voltage of 1.0 V within a frequency range of 100 mHz to 10 kHz satisfies the following formula:

$$\theta_{min} \geqq 30(\text{degrees}). \quad [F4]$$

A ninth mode of the present invention is directed to a specific embodiment of the inspection method of the seventh or eighth mode, wherein the rubber elastic layer is formed of an epichlorohydrin rubber.

A tenth mode of the present invention is directed to a specific embodiment of the inspection method of any of the seventh to ninth modes, wherein the rubber elastic layer has, on a surface thereof, a surface-treated layer which has been formed through treating the surface with a surface-treatment liquid containing an isocyanate; and the method includes, after removal of the surface-treated layer, determining whether or not the rubber elastic layer satisfies the relationship represented by the formula F3, wherein $\theta_{max}$ represents the maximum value of phase difference $\theta$ as measured upon application of an AC voltage of 1.0 V within a frequency range of 100 mHz to 10 kHz, and $\theta_{min}$ represents the minimum value of phase difference $\theta$ as measured under the same conditions.

An eleventh mode of the present invention is directed to a specific embodiment of the inspection method of the tenth mode, which includes determining whether or not the rubber elastic layer having the surface-treated layer satisfies the relationship represented by the formula F3, wherein $\theta_{max}$ represents the maximum value of phase difference $\theta$ as measured upon application of an AC voltage of 1.0 V within a frequency range of 100 mHz to 10 kHz, and $\theta_{min}$ represents the minimum value of phase difference $\theta$ as measured under the same conditions.

A twelfth mode of the present invention is directed to a specific embodiment of the inspection method of the tenth or eleventh mode, wherein the surface-treatment liquid further contain carbon black, and/or at least one polymer species selected from among an acrylic fluoropolymer and an acrylic silicone polymer.

EFFECTS OF THE INVENTION

As described above, the present invention provides a conductive roller having ion conductivity and containing carbon black micropowder, and having a ratio $\theta_{max}/\theta_{min}$ falling within a predetermined range, wherein $\theta_{max}$ represents the maximum value of phase difference $\theta$ as measured upon application of an AC voltage of 1.0 V within a frequency range of 100 mHz to 10 kHz, and $\theta_{min}$ represents the minimum value of phase difference $\theta$ as measured under the same conditions. The invention also provides an inspection method therefor. When employed as, for example, a charge-imparting roller, the roller of the present invention exhibits highly reliable characteristics.

BEST MODE FOR CARRYING OUT THE INVENTION

Figure 1:
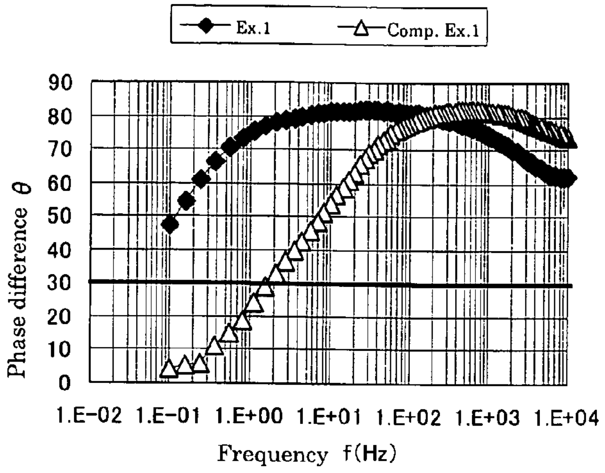
FIG. 1 A graph showing frequency characteristics of the samples produced in Example 1 and Comparative Example 1.

The present invention has been accomplished on the basis of a finding that, in a conductive roller having a rubber elastic layer which has ion conductivity and which contains carbon micropowder, the actual carbon micropowder dispersion state cannot be evaluated by conventionally employed electrical resistance but can be evaluated on the basis of frequency characteristics of phase difference $\theta$.

The present applicant previously filed an application of an invention on the basis of a finding that, in a conductive roller having a rubber elastic layer to which conductivity has been imparted by conductive carbon micropowder, the actual dispersion state cannot be evaluated by conventionally employed electrical resistance but can be evaluated on the basis of impedance (Japanese Patent Application No. 2004-381374). However, the present invention has been accomplished on the basis of a finding that a rubber elastic body having ion conductivity exhibits an electrical behavior differing from that of a rubber elastic body to which conductivity has been imparted by carbon micropowder and another finding that dispersion failure such as aggregation can be detected through observation of phase difference within a predetermined frequency range.

In other words, the inventors have found the following. Through careful observation of the dispersion state of carbon micropowder, there can be observed an area of a rubber layer including no carbon, which area has been formed by local aggregation of carbon micropowder caused by a slightly poor dispersion state. Electrical resistance of the rubber layer is virtually insensitive to the presence or absence of the carbon-deficient area, but variations arise in the phase difference within a predetermined frequency range. The present invention has been accomplished on the basis of this finding.

In the present invention, it is essential that the conductive roller has ion conductivity and contains carbon micropowder.

In the present invention, the conductive roller contains carbon micropowder which serves as a filler. Thus, it is very important that electron conductivity via conductive paths formed by the carbon micropowder is suppressed to a level as low as possible and that ion conductivity is effectively attained. Therefore, the thus-added carbon micropowder is dispersed as uniformly as possible, so as not to form localized conductive paths. Notably, use of a filler which does not form conductive paths such as calcium carbonate is problematic, since ion conductivity excessively increases under varied circumstances due to a high hygroscopic property thereof.

In the present invention, the expression "having ion conductivity" refers to "having an intrinsic ion conductivity of a rubber substrate (e.g., epichlorohydrin rubber)" or "having an ion conductivity imparted by an ion-conducting agent (e.g., the above ion-conducting rubber substrate or a generally employed rubber substrate)."

Examples of the rubber substrate forming the rubber elastic layer include epichlorohydrin rubber, chloroprene, nitrile rubber (NBR), millable polyurethane, and blends thereof. Of these, epichlorohydrin rubber-based substrates are preferred.

Examples of the epichlorohydrin rubber includes epichlorohydrin homopolymer, epichlorohydrin-ethylene oxide copolymer, epichlorohydrin-allyl glycidyl ether copolymer, and epichlorohydrin-ethylene oxide-allyl glycidyl ether terpolymer.

Into the rubber elastic layer, an ion-conducting agent may be added. Examples of the ion-conducting agent include alkali metal (e.g., Li, Na, or K) salts, acetate salts, sulfate salts, and perchlorate salts. No particular limitation is imposed on the amount of ion-conducting agent to be added, so long as a conductivity of interest can be attained. For example, the amount is about 0.001 to 3.0 parts by weight with respect to 100 parts by weight of the rubber component.

The rubber elastic layer of the present invention contains carbon micropowder. An example of the carbon micropowder is at least one carbon black species predominantly containing carbon black. There are several carbon black species including conductive carbon black and slightly conductive carbon black having comparatively low conductivity. In the present invention, conductivity of the rubber elastic layer is attributed predominantly to ion conduction. Therefore, slightly conductive carbon black is preferably employed. Needless to say, a plurality of carbon black species may be used in combination. The amount of carbon black to be added, which varies depending on the target electrical resistance, is, for example, about 40 to 150 parts by weight, preferably about 70 to 110 parts by weight, with respect to 100 parts of rubber substrate.

In the conductive roller of the present invention, carbon micropowder is preferably dispersed at the highest dispersion degree. Thus, a dispersion-enhancer may be added so long as the effects of the invention are not impaired. In order to enhance dispersibility of carbon micropowder, a rubber component may be blended. Specifically, when epichlorohydrin rubber is employed, dispersibility of carbon micropowder can be enhanced through blending NBR. Among NBR products, liquid NBR is particularly preferable an additive for enhancing dispersibility of carbon.

Preferably, the conductive roller of the present invention has ion conductivity and contains carbon micropowder. Electrical resistance of the conductive roller varies in accordance with applied voltage. The electrical resistance values upon application of 5 V, 50 V, and 100 V, represented by $Rv_5$, $Rv_{50}$, and $Rv_{100}$, respectively, preferably fall within a range of $10^4$ to $10^9 \Omega$.

The conductive roller of the present invention has a conductive rubber elastic layer which satisfies the relationship represented by formula 1, wherein $\theta_{max}$ represents the maximum value of phase difference $\theta$ as measured upon application of an AC voltage of 1.0 V within a frequency range of 100 mHz to 10 kHz, and $\theta_{min}$ represents the minimum value of phase difference $\theta$ as measured under the same conditions. So long as the layer has such a conductive rubber elastic layer, the layer may have a single-layer structure or a double-layer structure. On the rubber elastic layer, a protective layer or a high-resistance layer may be provided so as to prevent staining or leakage. In this case, so long as the rubber elastic layer satisfies the aforementioned conditions, such a laminated rubber layer structure also falls within the scope of the invention. Although details are described hereinbelow, when the rubber elastic layer is formed of epichlorohydrin rubber and has, on a surface thereof, a surface-treated layer which has been formed through treating the surface with a surface-treatment liquid containing an isocyanate, the rubber elastic layer having the surface-treated layer satisfies the aforementioned conditions. In addition, after removal of the surface-treated layer, the rubber elastic layer also satisfies the relationship represented by $|\theta_{max}/\theta_{min}| \leqq 5$, wherein $\theta_{max}$ represents the maximum value of phase difference $\theta$ as measured upon application of an AC voltage of 1.0 V within a frequency range of 100 mHz to 10 kHz, and $\theta_{min}$ represents the minimum value of phase difference $\theta$ as measured under the same conditions. Particularly, the minimum value $\theta_{min}$ is preferably 30 (degrees) or more.

In the present invention, the condition, $|\theta_{max}/\theta_{min}| \leqq 5$, wherein $\theta_{max}$ represents the maximum value of phase difference $\theta$ as measured upon application of an AC voltage of 1.0 V within a frequency range of 100 mHz to 10 kHz, and $\theta_{min}$ represents the minimum value of phase difference $\theta$ as measured under the same conditions, is derived from the test results mentioned hereinbelow. The above condition will next be described more specifically. As used herein, $\theta_{max}$ is the maximum value of phase difference $\theta$ as measured within a frequency range of 100 mHz to 10 kHz, and $\theta_{min}$ is the minimum value of phase difference $\theta$ as measured under the same conditions.

When the absolute value $|\theta_{max}/\theta_{min}|$ is small, the aforementioned condition can be readily satisfied, whereas when the absolute value $|\theta_{max}/\theta_{min}|$ is large, the condition is difficult to satisfy. The state in which the absolute value $|\theta_{max}/\theta_{min}|$ falls outside the above-specified range means a state in which phase difference varies considerably within a predetermined frequency range. This state is attributable to formation of conductive paths through local aggregation of carbon micropowder in the conductive elastic layer, increasing the difference between the maximum value and the minimum value of phase difference within a low-frequency range of 100 mHz to 10 kHz.

Thus, in order to produce the conductive roller of the present invention, dispersibility of carbon micropowder is enhanced to the highest level, and no particular limitation is imposed on the production method. Although production conditions for attaining excellent dispersibility of carbon black have been predetermined, actually attained dispersibility varies depending on the lot of carbon black products. Therefore, conductive rollers satisfying the above relationship can be consistently produced through inspection of phase difference $\theta$.

The present invention has been accomplished on the basis of the aforementioned viewpoint. Accordingly, the inspection method of the present invention is directed to a method for inspecting a conductive roller, comprising determining whether or not the rubber elastic layer satisfies the relationship represented by $|\theta_{max}/\theta_{min}| \leqq 5$, wherein $\theta_{max}$ represents the maximum value of phase difference $\theta$ as measured upon application of an AC voltage of 1.0 V within a frequency range of 100 mHz to 10 kHz, and $\theta_{min}$ represents the minimum value of phase difference $\theta$ as measured under the same conditions. Preferably, the method comprises determining whether or not the minimum value $\theta_{min}$ of phase difference $\theta$ as measured upon application of an AC voltage of 1.0 V within a frequency range of 100 mHz to 10 kHz satisfies $\theta_{min} \geqq 30$ (degrees). Through employment of the method, dispersion state of carbon micropowder can be evaluated without inspecting image characteristics. In addition, when a rubber sheet for fabricating a conductive roller is inspected, the carbon micropowder dispersion state can be evaluated. Therefore, the number of failure final products can be drastically reduced.

The inspection method of the present invention can be applied to conductive rollers which have been produced through any production methods. When the inspection method is applied to a conductive roller which has been produced through a production method that readily causes variation in dispersibility of carbon microparticles, percent failure of final roller products can be remarkably reduced.

In the case where the rubber elastic layer does not satisfy the relationship represented by $|\theta_{max}/\theta_{min}| \leqq 5$, wherein $\theta_{max}$ represents the maximum value of phase difference θ as measured upon application of an AC voltage of 1.0 V within a frequency range of 100 mHz to 10 kHz, and $\theta_{min}$ represents the minimum value of phase difference θ as measured under the same conditions and moreover, the minimum value $\theta_{min}$ of phase difference θ as measured upon application of an AC voltage of 1.0 V within a frequency range of 100 mHz to 10 kHz satisfies $\theta_{min}<30$ (degrees), a number of aggregates of carbon micropowder are formed, and conductive paths may be formed from the aggregates.

In the inspection method of the present invention, a voltage of 1.0 V is applied to the rubber elastic layer so as not to leave high voltage hysteresis during inspection. When the conductive roller of the invention is installed in an actual machine, a high voltage, which is for example about 500 to 1,000 times the voltage applied during inspection, is applied thereto. However, if the roller is inspected at such a high applied voltage, high voltage hysteresis remains in the charge-imparting roller. Needless to say, such hysteresis is not preferred, since the roller may be damaged in appearance (damage on rubber surface). In the inspection, direct reproduction of a phenomenon occurring in an actual machine is not needed, and the roller may be relative evaluated, which is more preferred. The inspection method of the present invention is also remarkably excellent in that product failures can be prevented through inspection at very low voltage without checking image characteristics.

The conductive roller of the present invention may be covered with a resin tube or the like serving as a protective layer or a high-resistance layer. Alternatively, a surface-treated layer may be provided on a surface of the rubber elastic layer through surface treatment by use of a surface treatment liquid containing an isocyanate. The thus-formed surface-treated layer is advantageous, since the layer imparts a stain-prevention property to the roller without greatly varying electrical resistance, as compared with the aforementioned resin tube.

The surface treatment liquid for forming a surface-treated layer by use of isocyanate may be a solution of an isocyanate compound in an organic solvent, or the solution further containing carbon black. Alternatively, a solution of an isocyanate compound in an organic solvent to which at least one polymer selected from an acrylic fluoropolymer and an acrylic silicone polymer has been added, and the solution further containing a conductivity-imparting agent may also be employed.

Examples of the isocyanate compound include 2,6-tolylene diisocyanate (TDI), 4,4'-diphenylmethane diisocyanate (MDI), p-phenylene diisocyanate (PPDI), 1,5-naphthalene diisocyanate (NDI), 3,3-dimethyldiphenyl-4,4'-diisocyanate (TODI), and the aforementioned oligomers and modified prepolymers.

The conductive roller of the present invention is particularly suitable for a charge-imparting roller.

The present invention will next be described in detail by way of examples, which should not be construed as limiting the invention thereto.

EXAMPLES

Example 1

Epichlorohydrin rubber (Epichlomer CG102, product of Daiso Co., Ltd.) (100 parts by weight), carbon (mean particle size of 200 nm) serving as a filler (100 parts by weight), and lithium perchlorate ($LiClO_4$) serving as a conducting agent (0.3 parts by weight) were kneaded with a vulcanizer by means of a roll kneader, and the kneaded product was sheet-press-molded for vulcanization, to thereby for a flat sheet (sample of Example 1).

Example 2

The conductive rubber produced in Example 1 was applied onto a surface of a metal shaft (diameter: 8 mm) and pressed for vulcanization. The product was polished to form a conductive roller (diameter: 11 mm) (sample of Example 2).

Example 3

The conductive roller produced in Example 2 was surface-treated with a surface-treatment liquid, which had been prepared by dissolving an isocyanate compound (MDI, product of Dainippon Ink and Chemicals, Inc.) (20 parts by weight) in ethyl acetate (100 parts by weight), to thereby form a surface-treated layer. Specifically, the roller was immersed in the surface-treatment liquid at 23° C. for 30 seconds, and heated in an oven at 120° C. for one hour, to thereby form the surface-treated layer (sample of Example 3).

Example 4

Epichlorohydrin rubber (Epichlomer CG102, product of Daiso Co., Ltd.) (100 parts by weight), liquid NBR (Nipol 1312, product of Nippon Zeon Co., Ltd.) serving as an additive (10 parts by weight), carbon (mean particle size of 200 nm) serving as a filler (20 parts by weight), acetylene black (conductive carbon, Denka Black, product of Denki Kagaku Kogyo K. K.) serving as a charge-imparting agent (15 parts by weight), and tetraethylammonium p-toluenesulfonate (Et4N-pTS) serving as an ion conducting agent (0.8 parts by weight) were kneaded with a vulcanizer by means of a roll kneader, and the kneaded product was sheet-press-molded for vulcanization, to thereby for a flat sheet (sample of Example 4).

Example 5

The procedure of Example 2 was repeated, except that the conductive rubber produced in Example 4 was employed, to thereby produce a conductive roller of Example 5.

Example 6

The surface of the conductive roller of Example 5 was treated in a manner similar to that of Example 3, to thereby produce a conductive roller of Example 6.

Example 7

Epichlorohydrin rubber (Epichlomer CG102, product of Daiso Co., Ltd.) (80 parts by weight), liquid NBR (Nipol 1312, product of Nippon Zeon Co., Ltd.) serving as an additive (20 parts by weight), carbon (mean particle size of 200 nm) serving as a filler (80 parts by weight), conductive carbon (Toka Black #5500, product of Tokai Carbon Co., Ltd.) serving as a charge-imparting agent (20 parts by weight), and sodium trifluoroacetate ($CF_3COONa$) serving as an ion conducting agent (0.8 parts by weight) were kneaded with a vulcanizer by means of a roll kneader, and the kneaded product was sheet-press-molded for vulcanization, to thereby for a flat sheet (sample of Example 7).

Example 8

The procedure of Example 2 was repeated, except that the conductive rubber produced in Example 7 was employed, to thereby produce a conductive roller of Example 8.

Example 9

The conductive roller of Example 8 was treated in a manner similar to that of Example 3, to thereby produce a conductive roller of Example 9.

Comparative Example 1

The procedure of Example 1 was repeated, except that carbon of a production lot different from that employed in Example 1, to thereby produce a sample of Comparative Example 1.

Comparative Example 2

The procedure of Example 2 was repeated, except that carbon of the production lot employed in Comparative Example 1, to thereby produce a sample of Comparative Example 2.

Comparative Example 3

The conductive roller of Comparative Example 2 was treated in a manner similar to that of Example 3, to thereby produce a conductive roller of Comparative Example 3.

Comparative Example 4

The procedure of Example 7 was repeated, except that liquid NBR (Nipol 1312, product of Nippon Zeon Co., Ltd.) was not employed. A sample of Comparative Example 4 was produced through the procedure of Example 1.

Comparative Example 5

The procedure of Example 2 was repeated, except that the conductive rubber produced in Comparative Example 4 was employed, to thereby produce a conductive roller of Comparative Example 5.

Comparative Example 6

The conductive roller of Comparative Example 5 was treated in a manner similar to that of Example 3, to thereby produce a conductive roller of Comparative Example 6.

Comparative Example 7

The procedure of Example 7 was repeated, except that conductive carbon (Toka Black #5500, product of Tokai Carbon Co., Ltd.) was changed to Ketjen Black EC (product of Ketjen Black International). A sample of Comparative Example 7 was produced through the procedure of Example 1.

Comparative Example 8

The procedure of Example 2 was repeated, except that the conductive rubber produced in Comparative Example 7 was employed, to thereby produce a conductive roller of Comparative Example 8.

Comparative Example 9

The conductive roller of Comparative Example 8 was treated in a manner similar to that of Example 3, to thereby produce a conductive roller of Comparative Example 9.

Test Example 1

Measurement of Electrical Resistance of Flat Sheet

Electrical resistances (surface resistance and volume resistivity) of the samples of Examples 1, 4 and 7 and Comparative Examples 1, 4, and 7 were measured at an application voltage of 100 V. The measurement was carried out at eight sites on each sample, with the electrode set being moved, and the maximum value, the minimum value, and the mean value were obtained. The measurement was performed by means of a ULTRA HIGH RESISTANCE METER R8340A (product of Advantest Corporation). Table 1 and 2 show the results.

Test Example 2

Measurement of Electrical Resistance of Roller

Electrical resistances of the conductive rollers of Examples 2, 3, 5, 6, 8, and 9 and Comparative Examples 2, 3, 5, 6, 8, and 9 were measured at an application voltage of 100 V. Specifically, each roller was placed on an electrode member made of an SUS 304 sheet, and a load of 500 g was applied to each end of the roller. The voltage was applied thereto for 30 seconds. Thereafter, the resistance between the core metal and the electrode member was measured by means of a ULTRA HIGH RESISTANCE METER R8340A (product of Advantest Corporation). The measurement was carried out at eight sites on each roller, while the roller was rotated in a stepwise manner by 45°, and the maximum value, the minimum value, and the mean value were obtained.

In the measurement of surface resistance, a conductive tape was attached onto the surface of each roller, and resistance was determined at an electrode gap of 1 cm, and an applied voltage of 100 V (for 30 seconds). The measurement was carried out at eight sites along the axial direction, and the maximum value, the minimum value, and the mean value were obtained. Table 1 and 2 show the results.

Test Example 3

Evaluation of Frequency Characteristics of Phase Difference θ

Frequency-dependency of phase difference θ of each of the sheets and rollers of Examples 1 to 9 and Comparative Examples 1 to 9 was determined by means of an impedance analyzer (Impedance analyzer IM6e, product of BHA). Specifically, a load of 500 g was applied to each end of the roller, and $\theta_{max}/\theta_{min}$ (phase difference θ ratio) of each sample was determined at an applied voltage of 1 V within an AC frequency range of 100 mHz to 10 kHz under N/N conditions (25° C., 50% RH).

Figure 2:
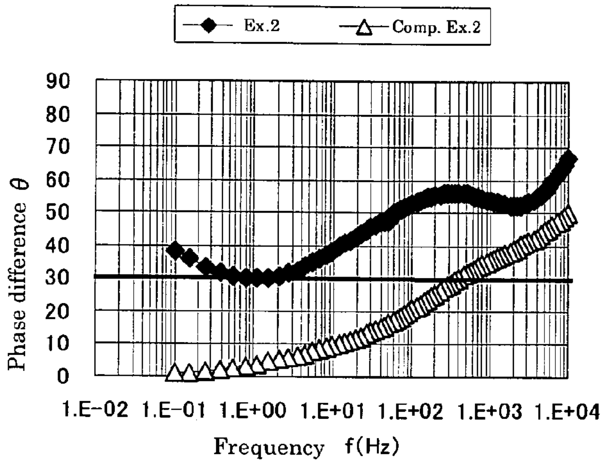
FIG. 2 A graph showing frequency characteristics of the samples produced in Example 2 and Comparative Example 2.
Figure 3:
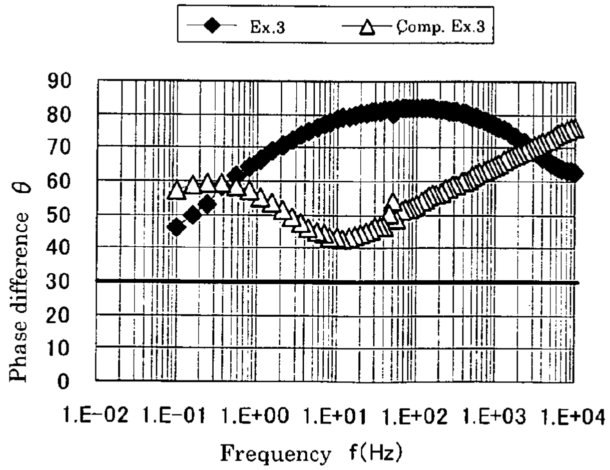
FIG. 3 A graph showing frequency characteristics of the samples produced in Example 3 and Comparative Example 3.
Figure 4:
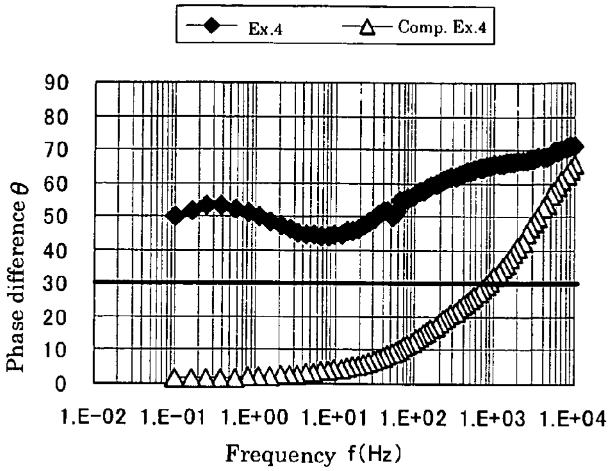
FIG. 4 A graph showing frequency characteristics of the samples produced in Example 4 and Comparative Example 4.
Figure 5:
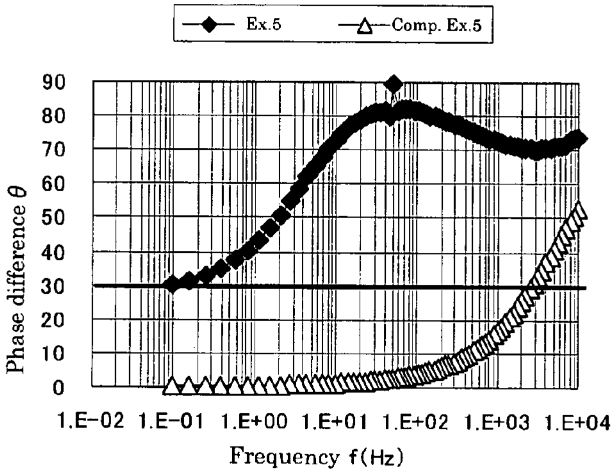
FIG. 5 A graph showing frequency characteristics of the samples produced in Example 5 and Comparative Example 5.
Figure 6:
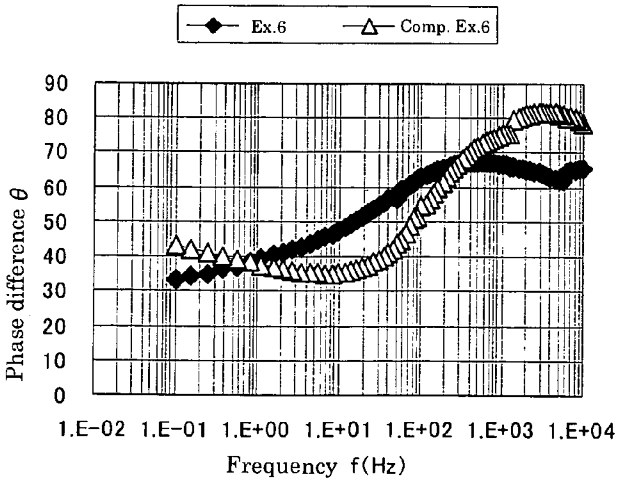
FIG. 6 A graph showing frequency characteristics of the samples produced in Example 6 and Comparative Example 6.
Figure 7:
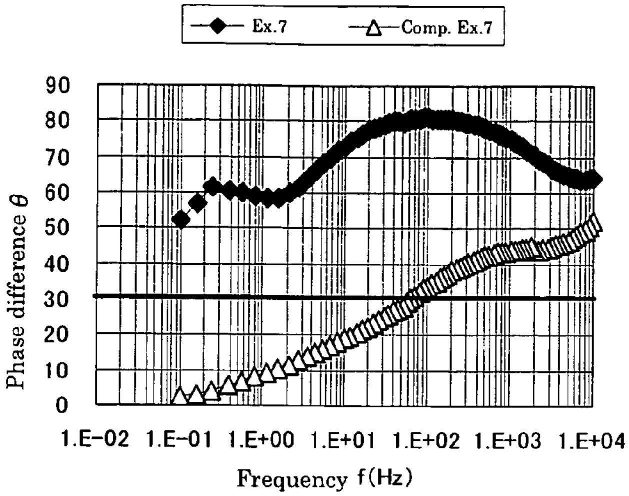
FIG. 7 A graph showing frequency characteristics of the samples produced in Example 7 and Comparative Example 7.
Figure 8:
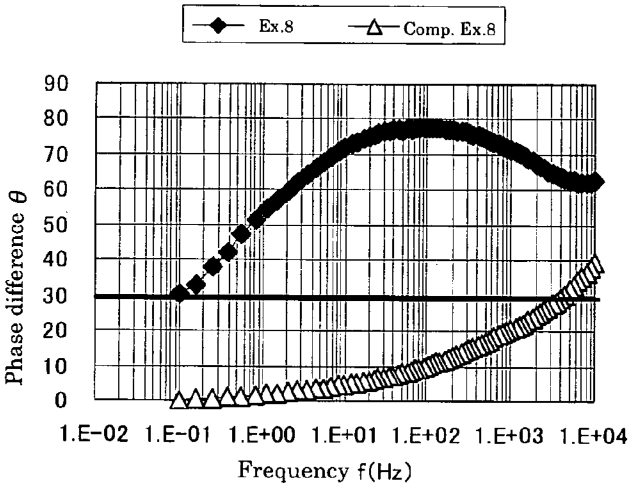
FIG. 8 A graph showing frequency characteristics of the samples produced in Example 8 and Comparative Example 8.
Figure 9:
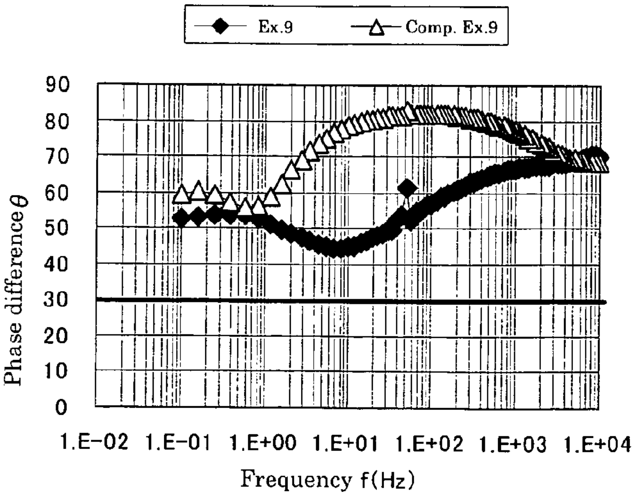
FIG. 9 A graph showing frequency characteristics of the samples produced in Example 9 and Comparative Example 9.

Table 1 shows $|\theta_{max}/\theta_{min}|$ values of the samples of Examples 1 to 9 and Comparative Examples 1 to 9. FIGS. 1 to 9 show frequency characteristics of sheets (Examples 1, 4, and 7 and Comparative Examples 1, 4, and 7); conductive rollers (Examples 2, 5, and 8 and Comparative Examples 2, 5, and 8); and charge-imparting rollers (Examples 3, 6, and 9 and Comparative Examples 3, 6, and 9).

Test Example 4

Image Quality Evaluation

Each of the rollers of Example 3 and Comparative Example 3 was installed as a charge-imparting roller in a commercial printer, and obtained images were evaluated under L/L conditions (10° C., 30% RH), N/N conditions (25° C., 50% RH), and H/H conditions (35° C., 85% RH). The results are shown in Tables 1 and 2.

Test Example 5

Measurement of Impedance of Re-Polished Sample

The surface of each of the charge-imparting rollers of Examples 3, 6, and 9 and Comparative Examples 3, 6, and 9 was re-polished to a depth of 0.5 mm, to thereby remove the surface-treated layer, and impedance was measured in a manner similar to that of Test Example 3, whereby $\theta_{max}/\theta_{min}$ (phase difference θ ratio) was determined. The results are shown in Table 3.

TABLE 1

| | | Ex. 1 | Ex. 2 | Ex. 3 | Ex. 4 | Ex. 5 |
|---|---|---|---|---|---|---|
| Epichlorohydrin rubber | | 100 | 100 | 100 | 100 | 100 |
| Liquid NBR | | — | — | — | 10 | 10 |
| Carbon (mean particle size: 200 nm) | | 100 | 100 | 100 | 20 | 20 |
| Conductive carbon (Denka Black) | | — | — | — | 15 | 15 |
| Conductive carbon (Ketjen Black) | | — | — | — | — | — |
| Conductive carbon (Toka Black) | | — | — | — | — | — |
| Ion-conducting agent ($LiClO_4$) | | 0.3 | 0.3 | 0.3 | — | — |
| Ion-conducting agent ($CF_3COONa$) | | — | — | — | — | — |
| Ion-conducting agent (Et4N-pTS) | | — | — | — | 0.8 | 0.8 |
| Surface treatment | | — | no | yes | — | no |
| Surface resistance (logΩ) | Av. | 8.69 | 7.74 | 8.04 | 5.90 | 4.80 |
| | Max/min | 1.16 | 3.59 | 2.06 | 1.21 | 1.13 |
| Volume resistivity (logΩ) | Av. | 7.66 | 7.23 | 7.64 | 4.62 | 4.50 |
| | Max/min | 1.26 | 3.64 | 1.59 | 1.24 | 1.09 |
| Phase difference | $|\theta_{max}/\theta_{min}|$ | 1.72 | 2.21 | 1.59 | 1.79 | 2.96 |
| | $\theta_{min}$ | 47.6 | 30.1 | 44.8 | 45.9 | 30.2 |
| Image quality | | — | — | ○ | — | — |
| Note | | sheet | * | ** | sheet | * |

*) Non-surface-treated, image quality not evaluated
**) Excellent under all conditions

| | | Ex. 6 | Ex. 7 | Ex. 8 | Ex. 9 |
|---|---|---|---|---|---|
| Epichlorohydrin rubber | | 100 | 80 | 80 | 80 |
| Liquid NBR | | 10 | 20 | 20 | 20 |
| Carbon (mean particle size: 200 nm) | | 20 | 80 | 80 | 80 |
| Conductive carbon (Denka Black) | | 15 | — | — | — |
| Conductive carbon (Ketjen Black) | | — | — | — | — |
| Conductive carbon (Toka Black) | | — | 20 | 20 | 20 |
| Ion-conducting agent ($LiClO_4$) | | — | — | — | — |
| Ion-conducting agent ($CF_3COONa$) | | — | 0.8 | 0.8 | 0.8 |
| Ion-conducting agent (Et4N-pTS) | | 0.8 | — | — | — |
| Surface treatment | | yes | — | no | yes |
| Surface resistance (logΩ) | Av. | 5.25 | 6.62 | 5.52 | 6.41 |
| | Max/min | 1.10 | 1.41 | 2.31 | 1.89 |
| Volume resistivity (logΩ) | Av. | 4.95 | 6.21 | 5.03 | 6.22 |
| | Max/min | 1.06 | 1.24 | 1.41 | 2.53 |
| Phase difference | $|\theta_{max}/\theta_{min}|$ | 2.03 | 1.55 | 2.55 | 1.59 |
| | $\theta_{min}$ | 33.2 | 52.4 | 30.4 | 44.6 |
| Image quality | | ○ | — | — | ○ |
| Note | | ** | sheet | * | ** |

*) Non-surface-treated, image quality not evaluated
**) Excellent under all tested conditions

TABLE 2

| | Comp. Ex. 1 | Comp. Ex. 2 | Comp. Ex. 3 | Comp. Ex. 4 | Comp. Ex. 5 |
|---|---|---|---|---|---|
| Epichlorohydrin rubber | 100 | 100 | 100 | 80 | 80 |
| Liquid NBR | — | — | — | — | — |
| Carbon (mean particle size: 200 nm) | 100 | 100 | 100 | 80 | 80 |
| Conductive carbon (Denka Black) | — | — | — | — | — |
| Conductive carbon (Ketjen Black) | — | — | — | — | — |

TABLE 2-continued

| | | | | | | |
|---|---|---|---|---|---|---|
| Conductive carbon (Toka Black) | | — | — | — | 20 | 20 |
| Ion-conducting agent ($LiClO_4$) | | 0.3 | 0.3 | 0.3 | — | — |
| Ion-conducting agent ($CF_3COONa$) | | — | — | — | 0.8 | 0.8 |
| Ion-conducting agent (Et4N-pTS) | | — | — | — | — | — |
| Surface treatment | | — | no | yes | — | no |
| Surface resistance (logΩ) | Av. | 7.66 | 6.58 | 7.89 | 6.89 | 5.78 |
| | Max/min | 1.39 | 97.0 | 1.38 | 1.41 | 41.5 |
| Volume resistivity (logΩ) | Av. | 7.14 | 5.85 | 7.42 | 6.43 | 5.82 |
| | Max/min | 1.04 | 30.0 | 2.30 | 1.53 | 59.2 |
| Phase difference | $\|\theta_{max}/\theta_{min}\|$ | 19.97 | 61.9 | 1.73 | 40.26 | 107.7 |
| | $\theta_{min}$ | 4.10 | 0.81 | 45.9 | 1.63 | 1.63 |
| Image quality | | — | — | X | — | — |
| Note | | sheet | * | *** | sheet | * |

*) Non-surface-treated, image quality not evaluated
***) Leakage observed occurring under all tested conditions

| | | Comp. Ex. 6 | Comp. Ex. 7 | Comp. Ex. 8 | Comp. Ex. 9 |
|---|---|---|---|---|---|
| Epichlorohydrin rubber | | 80 | 80 | 80 | 80 |
| Liquid NBR | | — | 20 | 20 | 20 |
| Carbon (mean particle size: 200 nm) | | 80 | 80 | 80 | 80 |
| Conductive carbon (Denka Black) | | — | — | — | — |
| Conductive carbon (Ketjen Black) | | — | 20 | 20 | 20 |
| Conductive carbon (Toka Black) | | 20 | — | — | — |
| Ion-conducting agent ($LiClO_4$) | | — | — | — | — |
| Ion-conducting agent ($CF_3COONa$) | | 0.8 | 0.8 | 0.8 | 0.8 |
| Ion-conducting agent (Et4N-pTS) | | — | — | — | — |
| Surface treatment | | yes | — | no | yes |
| Surface resistance (logΩ) | Av. | 6.72 | 5.00 | 4.34 | 4.83 |
| | Max/min | 1.57 | 2.51 | 56.8 | 3.15 |
| Volume resistivity (logΩ) | Av. | 6.13 | 4.32 | 3.98 | 4.13 |
| | Max/min | 3.12 | 1.87 | 48.1 | 2.98 |
| Phase difference | $\|\theta_{max}/\theta_{min}\|$ | 2.33 | 20.40 | 158.2 | 1.48 |
| | $\theta_{min}$ | 35.0 | 2.55 | 0.25 | 55.9 |
| Image quality | | X | — | — | X |
| Note | | **** | sheet | * | **** |

*) Non-surface-treated, image quality not evaluated
****) Leakage observed under LL conditions

TABLE 3

| After re-polishing | Ex. 3 | Ex. 6 | Ex. 9 | Comp. Ex. 3 | Comp. Ex. 6 | Comp. Ex. 9 |
|---|---|---|---|---|---|---|
| $\|\theta_{max}/\theta_{min}\|$ | 1.90 | 2.50 | 2.07 | 60.6 | 104.8 | 152.1 |
| $\theta_{min}$ | 37.5 | 31.7 | 37.49 | 0.77 | 1.55 | 0.24 |

(Test Results)

The test results are as follows.

The samples of Examples 1 to 3 exhibited a $|\theta_{max}/\theta_{min}|$ value smaller than 5, indicating that carbon was sufficiently dispersed in the polymer and that only a few conductive paths were formed from carbon micropowder in the polymer. Therefore, leakage which would otherwise be caused by conductive paths was suppressed, and electrical resistance values and phase difference θ was maintained as shown in Table 1.

In the case of a surface-treated sample (Example 3), excellent image quality was attained under all of the tested conditions.

In contrast, the samples of Comparative Examples 1 to 2 exhibited a $|\theta_{max}/\theta_{min}|$ value considerably greater than 5, possibly because of employment of a carbon product of a lot impairing dispersion of carbon in polymer. Dispersion of carbon was poor as compared with the samples of Examples 1 to 3 which had been kneaded under the same conditions. Such poor dispersion results in formation of a number of aggregates, which readily form conductive paths in the polymer. Therefore, electron conductivity is provided, thereby causing leakage.

In the case of a surface-treated sample (Comparative Example 3), defective images with, for example, black lines attributed to leakage was observed in image quality evaluation.

The samples of Examples 4 to 9, to which liquid NBR had been added and which contained different ion-conducting agents, exhibited the same tendency as observed in the case of Examples 1 to 3. When liquid NBR was added, even though conductive carbon was employed, excellent dispersion was attained. Thus, electron conduction was not provided, and ion conductivity was maintained.

In contrast, the samples of Comparative Examples 4 to 6, to which conductive carbon but no liquid NBR had been added, exhibited electron conductivity. Furthermore, in the samples of Comparative Examples 7 to 9, to which Ketjen Black having high conductivity had been added, electron conductivity was provided, even though liquid NBR was added.

Test Example 5 revealed that $|\theta_{max}/\theta_{min}|$ values and $\theta_{min}$ values obtained after removal of the surface-treated layer formed through surface treatment were almost equivalent to those obtained before surface treatment. Thus, even when the surface treatment has been completed, conditions before surface treatment can be determined by polishing off the surface-treated layer.

The invention claimed is:

1. A conductive roller comprising a metallic core and at least one rubber elastic layer provided on the outer peripheral surface of the core, the rubber elastic layer being formed from a conductive rubber which has ion conductivity and which contains carbon black micropowder, and a surface layer formed on a surface of the rubber elastic layer, the surface layer being selected from the group consisting of a protective layer and a high-resistance layer, characterized in that said rubber elastic layer before providing the protective layer or the high-resistance layer, and said rubber elastic layer with the protective layer or the high-resistance layer, respectively, both satisfy the relationship represented by the following formula:

$$|\theta_{max}/\theta_{min}| \leqq 2.96, \quad [F1]$$

wherein $\theta_{max}$ represents the maximum value of phase difference θ as measured upon application of an AC voltage of 1.0 V within a frequency range of 100 mHz to 10 kHz, and $\theta_{min}$ represents the minimum value of phase difference θ as measured under the same conditions.

2. A conductive roller according to claim 1, wherein the minimum value $\theta_{min}$ satisfies the following formula:

$$\theta_{min} \geqq 30\text{(degrees)}. \quad [F2]$$

3. A conductive roller according to claim 1, wherein the rubber elastic layer is formed of an epichlorohydrin rubber.

4. A conductive roller according to claim 1, wherein the rubber elastic layer contains an ion-conducting agent.

5. A conductive roller according to claim 1, wherein the surface layer is a surface-treated layer which has been formed through treating the surface with a surface-treatment liquid containing an isocyanate; the rubber elastic layer having the surface-treated layer satisfies the relationship represented by the formula F1, wherein $\theta_{max}$ represents the maximum value of phase difference θ as measured upon application of an AC voltage of 1.0 V within a frequency range of 100 mHz to 10 kHz, and $\theta_{min}$ represents the minimum value of phase difference θ as measured under the same conditions; and, after removal of the surface-treated layer, the rubber elastic layer also satisfies the relationship represented by the formula F1, wherein $\theta_{max}$ represents the maximum value of phase difference θ as measured upon application of an AC voltage of 1.0 V within a frequency range of 100 mHz to 10 kHz, and $\theta_{min}$ represents the minimum value of phase difference θ as measured under the same conditions.

6. A conductive roller according to claim 5, wherein the surface-treatment liquid further contains carbon black, and/or at least one polymer species selected from among an acrylic fluoropolymer and an acrylic silicone polymer.

7. A method for inspecting a conductive roller having a metallic core and at least one rubber elastic layer provided on the outer peripheral surface of the core, the rubber elastic layer being formed from a conductive rubber having ion conductivity and containing carbon black micropowder, and a surface layer formed on a surface of the rubber elastic layer, the surface layer being selected from the group consisting of a protective layer and a high-resistance layer, wherein the method comprises; measuring a phase difference θ with an impedance analyzer apparatus, and determining whether or not the rubber elastic layer before providing the protective layer or the high-resistance layer and said rubber elastic layer with the protective layer or the high-resistance layer, respectively, both satisfy the relationship represented by the following formula:

$$|\theta_{max}/\theta_{min}| \leqq 2.96, \quad [F3]$$

wherein $\theta_{max}$ represents the maximum value of phase difference θ as measured upon application of an AC voltage of 1.0 V within a frequency range of 100 mHz to 10 kHz, and $\theta_{min}$ represents the minimum value of phase difference θ as measured under the same conditions.

8. A method for inspecting a conductive roller according to claim 7, wherein the method comprises determining whether or not the minimum value $\theta_{min}$ of phase difference θ as measured upon application of an AC voltage of 1.0 V within a frequency range of 100 mHz to 10 kHz satisfies the following formula:

$$\theta_{min} \geqq 30\text{(degrees)}. \quad [F4]$$

9. A method for inspecting a conductive roller according to claim 7, wherein the rubber elastic layer is formed of an epichlorohydrin rubber.

10. A method for inspecting a conductive roller according to claim 7, wherein the surface layer is a surface-treated layer which has been formed through treating the surface with a surface-treatment liquid containing an isocyanate; and the method includes, after removal of the surface-treated layer, determining whether or not the rubber elastic layer satisfies the relationship represented by the formula F3, wherein $\theta_{max}$ represents the maximum value of phase difference θ as measured upon application of an AC voltage of 1.0 V within a frequency range of 100 mHz to 10 kHz, and $\theta_{min}$ represents the minimum value of phase difference θ as measured under the same conditions.

11. A method for inspecting a conductive roller according to claim 10, which method includes determining whether or not the rubber elastic layer having the surface-treated layer satisfies the relationship represented by the formula F3, wherein $\theta_{max}$ represents the maximum value of phase difference θ as measured upon application of an AC voltage of 1.0 V within a frequency range of 100 mHz to 10 kHz, and $\theta_{min}$ represents the minimum value of phase difference θ as measured under the same conditions.

12. A method for inspecting a conductive roller according to claim 10, wherein the surface-treatment liquid further contain carbon black, and/or at least one polymer species selected from among an acrylic fluoropolymer and an acrylic silicone polymer.

* * * * *

UNITED STATES PATENT AND TRADEMARK OFFICE

CERTIFICATE OF CORRECTION

PATENT NO. : 7,896,791 B2
APPLICATION NO. : 11/632046
DATED : March 1, 2011
INVENTOR(S) : Masashi Yamazaki et al.

It is certified that error appears in the above-identified patent and that said Letters Patent is hereby corrected as shown below:

Title page, left column,

Delete

"(86) PCT No.: PCT/JP2006/005604"

and insert

--(86) PCT No.: PCT/JP2006/305604--

Signed and Sealed this
Fourteenth Day of June, 2011

David J. Kappos
*Director of the United States Patent and Trademark Office*